US 8,594,512 B2

(12) United States Patent
Coelho et al.

(10) Patent No.: US 8,594,512 B2
(45) Date of Patent: Nov. 26, 2013

(54) METHOD AND APPARATUS FOR TRANSMISSION OF TWO MODULATED SIGNALS VIA AN OPTICAL CHANNEL

(75) Inventors: Leonardo Coelho, Munich (DE); Oscar Gaete, Munich (DE); Norbert Hanik, Berlin (DE); Bernhard Spinnler, Oberhaching (DE)

(73) Assignee: Nokia Siemens Networks OY, Espoo (FI)

( * ) Notice: Subject to any disclaimer, the term of this patent is extended or adjusted under 35 U.S.C. 154(b) by 248 days.

(21) Appl. No.: 13/120,247

(22) PCT Filed: Sep. 22, 2008

(86) PCT No.: PCT/EP2008/062634
§ 371 (c)(1),
(2), (4) Date: May 27, 2011

(87) PCT Pub. No.: WO2010/031451
PCT Pub. Date: Mar. 25, 2010

(65) Prior Publication Data
US 2011/0222865 A1    Sep. 15, 2011

(51) Int. Cl.
*H04B 10/04*    (2011.01)
*H04B 10/12*    (2011.01)
*H04B 10/06*    (2011.01)

(52) U.S. Cl.
USPC .......................................... 398/182; 398/208

(58) Field of Classification Search
USPC ............................................ 398/182, 75, 208
See application file for complete search history.

(56) References Cited

U.S. PATENT DOCUMENTS

| 6,335,814 | B1* | 1/2002 | Fuse et al. ..................... 398/201 |
| 6,798,994 | B1* | 9/2004 | Tsao et al. ..................... 398/204 |
| 7,773,883 | B1* | 8/2010 | Weng et al. ..................... 398/83 |
| 2003/0058504 | A1* | 3/2003 | Cho et al. ..................... 359/161 |
| 2005/0068887 | A1* | 3/2005 | Chen et al. ..................... 370/215 |
| 2005/0117914 | A1* | 6/2005 | Chuah et al. ..................... 398/182 |
| 2005/0271387 | A1* | 12/2005 | Kee et al. ..................... 398/140 |
| 2005/0286908 | A1* | 12/2005 | Way ..................... 398/186 |
| 2006/0132789 | A1* | 6/2006 | Davidson et al. ............. 356/477 |
| 2007/0297796 | A1* | 12/2007 | Calabro et al. ................. 398/43 |

* cited by examiner

*Primary Examiner* — Ken Vanderpuye
*Assistant Examiner* — Abbas H Alagheband
(74) *Attorney, Agent, or Firm* — Laurence A. Greenberg; Werner H. Stemer; Ralph E. Locher

(57) ABSTRACT

The arrangement includes a transmitter (1-6) with two optical sources (1, 2) generating two optical carrier signals ($L_1$, $L_2$) having different frequencies. The optical carrier signals ($L_1$, $L_2$) are combined and divided in a first coupler (2) and fed to carrier signal inputs of two modulators (4, 5). The mixed carrier signals ($L_1+jL_2$, $jL_1+L_2$) are separately modulated by two modulation signals (a(t)) and (b(t)) and the modulated signals (($A_1+jA_2$), ($jB_1+B_2$)) are combined in a first combiner and emitted as transmission signal (X(t)). Only on demodulator is necessary to regain the modulation signals (a(t), b(t)).

16 Claims, 2 Drawing Sheets

METHOD AND APPARATUS FOR TRANSMISSION OF TWO MODULATED SIGNALS VIA AN OPTICAL CHANNEL

FIELD OF THE INVENTION

The invention refers to an optical transmission method and an optical transmission system with high spectral bandwidth efficiency. The method is applicable for ASK/OOK (amplitude shift/on off keying) and for different kinds of phase modulations like DPSK (differential phase-shift keying).

BACKGROUND OF THE INVENTION

Nowadays optical data transmission systems are transmitting optical signals with high data rates. However, high data rates require not only high bandwidths and expensive components at the transmitter and at the receiver but also degrade for a given modulation schema the signal quality according to the system and fiber impairments, e.g. filter distortions, chromatic and polarisation mode dispersion.

Different transmission methods like orthogonal frequency-diversity modulation OFDM or polarisation multiplex diversity are used to reduce the channel symbol rate and to overcome these impairments. But the realisation of these methods leads to complex systems.

Wavelength division systems split high data rate signals into two or more signals with lower data rates to overcome the impairments scaling with the data rate. But filters and different demodulators are necessary to separate and regain the data signals.

Caplan et al. OFC 2007, paper OThD3 describe a transmission method using only a single interferometer to demodulate several wavelength channels exploiting the periodic transfer function of an delay interferometer. Nevertheless separate filters and optical-electrical converters are still necessary for each channel.

The transmission methods may make use of different kinds of modulation, e.g. as intensity modulation, phase or difference phase modulation.

Especially difference phase shift keying DPSK is preferred for optical transmission systems. The performance of DPSK transmission is described by e.g. A. H. Gnauck and P. J. Winzer in IEEE Journal of Lightwave Technology, vol. 23, No. 1, pp. 115-130, January 2005.

OBJECTS AND SUMMARY OF THE INVENTION

It is an object of the invention to disclose a method and an optical transmission system with high bandwidth efficiency and low complexity.

This problem is solved by a method for transmitting and a receiving two modulated signals as claimed, and a transmitter and a receiver as claimed.

Additional advantageously features are described in dependent claims.

The modulation of mixed carrier frequencies allows a simple separation of the modulation (data) signals. Only one optical demodulator and electrical-optical converter is necessary. The use of orthogonal signals allows the transmission in a narrow optical channel.

BRIEF DESCRIPTION OF THE DRAWINGS

Preferable embodiments of the invention will now be described, by way of an example, in more detail in conjunction with appended drawings, wherein.

DESCRIPTION OF PREFERRED EMBODIMENTS

Figure 1:
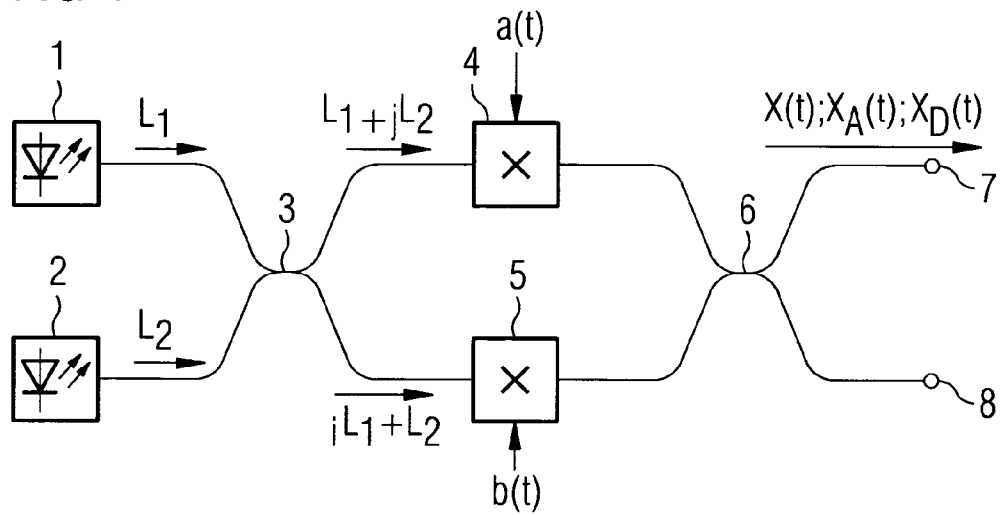
FIG. 1 shows a simplified diagram of a transmitter according to the invention.

The simplified diagram of FIG. 1 illustrates a transmitter for transmitting two modulation (data) signals a(t) and b(t). Optical amplifiers, polarisation controllers and control circuits well known for those skilled in the art are not shown for reasons of clarity.

The transmitter comprises two laser sources 1 and 2, each connected to an input of a first coupler 3 (3 dB optical coupler; combiner/splitter). The outputs of said first splitter 3 are connected to carrier inputs of a first modulator 4 and a second modulator 5 respectively. A first modulation signal a(t), corresponding e.g. to a digital data signal, is connected to a modulation signal input of the first modulator 4 and a second modulation signal b(t) is connected to a modulation signal input of the second modulator 5. The outputs of both modulators 4 and 5 are connected to a first combiner (3 dB optical coupler) 6. One output 7 is chosen as transmitter output.

The laser sources 1 and 2 emit a first carrier signals $L_1$ with a first carrier frequency $f_1$ and second carrier signal $L_2$ with a second carrier frequency $f_2$ having a phase difference compared to $f_1$. The carrier signals $L_1$ and $L_2$ are fed to the inputs of the first coupler 3 (3 dB coupler/splitter).

The output signals of the first coupler 3 are the input signals of the modulators 4 and 5 neglecting constant factors can be derived as $$\begin{pmatrix} 1 & j \\ j & 1 \end{pmatrix} \cdot \begin{pmatrix} L_1 \\ L_2 \end{pmatrix} = \begin{pmatrix} L_1 + jL_2 \\ jL_1 + L_2 \end{pmatrix} \quad (1)$$

The mixed carrier signals $L_1+jL_2$, $jL_1+L_2$ can also be derived by modulation a single laser source, e.g. as described in an article by A Sano, Proceedings of ECEC 2007, incorporated by reference.

The first mixed carrier signal $L_1+jL_2$ is modulated by the first modulation signal a(t) and the second mixed carrier signal $jL_1+L_2$ is modulated by the second modulation signal b(t):

$$\begin{pmatrix} L_1 + jL_2 \\ jL_1 + L_2 \end{pmatrix} \text{ modulation by } (a(t), b(t)) \to \begin{pmatrix} A_1 + jA_2 \\ jB_1 + B_2 \end{pmatrix} \quad (2)$$

with:
$A_1$=Carrier $L_1$ with modulation signal a(t),
$A_2$=Carrier $L_2$ modulated with modulation signal a(t),
$B_1$=Carrier $L_1$ modulated with modulation signal b(t),
$B_2$=Carrier $L_2$ modulated with modulation signal b(t),
j is the imaginary unit (sqrt(−1)),
the indices 1 and 2 are still indicating the carrier frequencies $f_1$ and $f_2$ respectively.

a(t) and b(t) are e.g. modulation signals representing a logic value of 1 or 0. Depending on the art of modulation the first modulated signal $A_1+jA_2$ and the second modulated signal $jB_1+B_2$ output from the modulators might be intensity or phase modulated.

The output signals of the modulators are combined by the first combiner 6 are $$\begin{pmatrix} 1 & j \\ j & 1 \end{pmatrix} \cdot \begin{pmatrix} A_1 + jA_2 \\ jB_1 + B_2 \end{pmatrix} = \begin{pmatrix} A_1 + jA_2 - B_1 + jB_2 \\ jA_1 - A_2 + jB_1 + B_2 \end{pmatrix} \quad (3)$$

One of the output signals of the first combiner 6 is chosen as a transmission signal, e.g. the transmission signal according to the first line of the resulting matrix emitted at a first combiner output 7 (the signal emitted at a second combiner output 8 could also be used).

$$X = A_1 + jA_2 - B_1 + jB_2 \quad (4)$$

or $$X = (A_1 - B_1) + j(A_2 + B_2) \quad (5)$$

Written as time depending equation, the transmission signal is $$X(t) = (A(t) - B(t))e^{j(2\pi f_1 t)} + (A(t) + B(t))e^{j(2\pi f_2 t + \Delta\Phi)} \quad (6)$$

with
$A_1 = A(t)e^{j(2\pi f_1 t)}$, $B_1 = B(t)e^{j(2\pi f_1 t)}$;
$jA_2 = A(t) e^{j(2\pi f_2 t + \Delta\Phi)}$, $jB_2 = B(t) e^{j(2\pi f_2 t + \Delta\Phi)}$
and $\Delta\Phi$-phase difference.

A(t) and B(t) correspond to baseband signals respectively modulation signals while the optical carrier signals are described in komplex form.

Applying equations (1) and (4) an intensity modulated transmission signal comes out as $$X_A(t) = (L_1 + jL_2)a(t) + (-L_1 + jL_2)b(t) \quad (7)$$

If the mixed carrier signals are intensity modulated, e.g. by a first binary or logical data signal a(t) and a second binary or logical data signal b(t), the standardised amplitudes of $(A_1 + jA_2) = (L_1 + L_2)a(t)$ and $(jB_1 + B_2) = (-L_1 + jL_2)b(t))$ may vary between 0 and 1 as functions of the modulating signals a(t) and b(t) respectively.

For a phase modulated signal, A(t) and B(t) correspond to baseband signals having a constant amplitude but different phases which might take the value of $e^{j\pi}$ or $e^{-j\pi}$ respectively and depend on the modulation signals a(t), b(t).

If DPSK (Difference Phase Shift Keying) is used the corresponding DPSK transmission signal is designated as $X_D(t)$.

Figure 2:
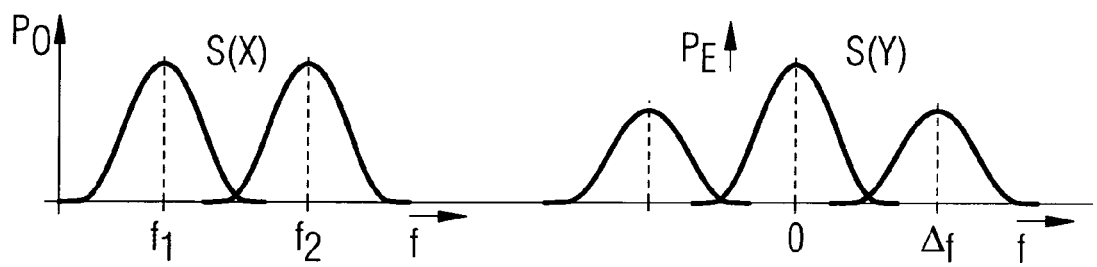
FIG. 2 shows an example of a spectrum of an optical transmission signal and a spectrum of a demodulated electrical signal.

An example of an optical spectrum S(X) (optical power $P_O$ as a function of the frequency f) of an optical transmission signal X(t) is shown in FIG. 2. The spectra related to the carrier frequencies $f_1$ and $f_2$ are separated by $\Delta f$ from each other, so that also the corresponding demodulated electrical spectra S(Y) (electrical power $P_E$ as a function of the frequency f) do not interfere which each other.

Figure 3:
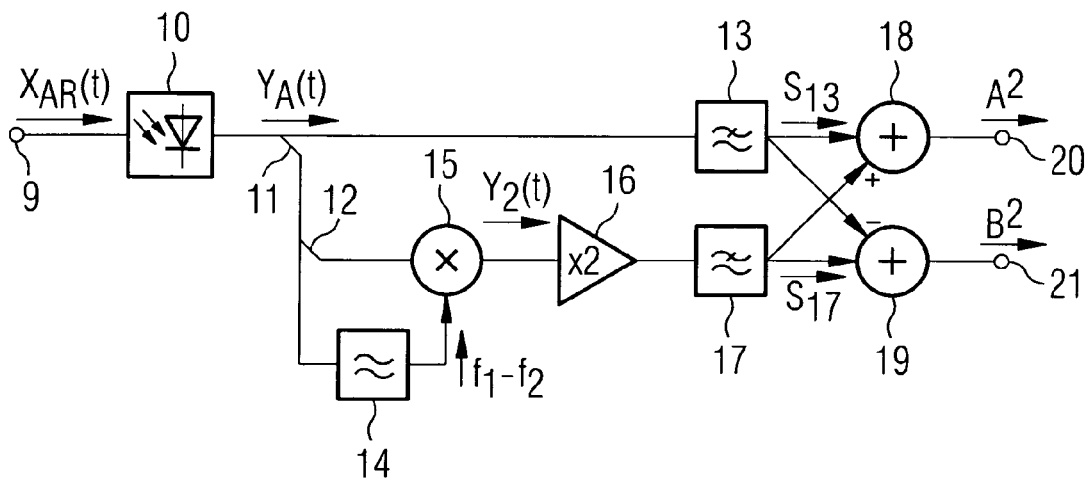
FIG. 3 shows a simplified diagram of a receiver according to the invention.

FIG. 3 shows a receiver for intensity modulated signals according to the invention. The receiver comprises an optical-electrical converter (photodiode) 10 receiving the transmission signal $X_{AR}(t)$ at its input 9. An output of the optical-electrical converter 10 is connected to a first splitter 11 of a signal separation circuit 11-19. An electrical signal $Y_A(t)$ output from the optical-electrical converter 10 is fed via said first splitter 11 directly to a first low pass filter 13. Another identical part of the electrical signal Y(t) is fed from a second splitter output via a second splitter 12 and a modulator 15 to a second low pass filter 17. The output signals of both filters 13, 17 are split and fed to a first adder 18 and a second adder 19.

Considering that the amplitude of the signals with different carrier frequencies $f_1$ and $f_2$ output from a modulator are always the same, we can simplify $|A_1|=|A_2|=A$ and $|B_1|=|B_2|=B$. In general, the optical-electrical converter 10 squares the received transmission signal X(t) of equation (6). The different kinds of modulations need not be considered here.

Making further use of the mathematical relations, the squared electrical signal output from the optical electrical converter 10 is:

$$Y(t) = (A-B)^2 + (A+B)^2 + 2(A-B)(A+B)\cos(2\pi(f_1-f_2)t - \Delta\Phi) \quad (8)$$

which is equal to $$Y(t) = 2(A^2+B^2) + 2(A^2-B^2)\cos(2\pi(f_1-f_2)t - \Delta\Phi) \quad (9)$$

After the first low pass filter 13 the signal $$S_{13} = 2(A^2+B^2) \quad (10)$$

remains. In FIG. 3 Y(t) is denoted as $Y_A(t)$ because ASK is applied.

In the lower signal path a synchronised oscillator 14, which receives via the second splitter 12 the electrical signal Y(t) for synchronisation, generates a phase-locked signal with an angular frequency co according to the difference $f_1-f_2$. The squared optical signal is modulated by said synchronized signal $\cos(\omega t - \Delta\Phi)$.

$$Y_2(t) = 2(A^2+B^2) + 2(A^2-B^2)\cos(\omega t - \Delta\Phi) \times \cos(\omega t - \Delta\Phi) \quad (11)$$

$$Y_2(t) = 2(A^2+B^2)\cos(\omega t - \Delta\Phi) + 2(A^2-B^2)\cos^2(\omega t - \Delta\Phi) \quad (12)$$

Applying mathematical relations $Y_2(t)$ becomes $$Y_2(t) = 2(A^2+B^2)\cos(\omega t - \Delta\Phi) + (A^2-B^2) + (A^2-B^2)\cos^2(2\omega t - 2\Delta\Phi) \quad (13)$$

This signal is amplified by factor 2 (or the signal S13 is attenuated). After the amplifier 16 and the second low pass filter 17 a second filter output signal $$S_{17} = 2(A^2-B^2) \quad (14)$$

remains. This signal is added to the first filter output signal S13 by the first adder 18 and subtracted from S13 by the second adder 19. Therefore a first output signal $A_0$ and a second output signal $B_0$ becomes $$A_0 = 2(A^2+B^2+A^2-B^2) = 4A^2 \quad (15)$$

$$B_0 = 2(A^2+B^2-A^2+B^2) = 4B^2 \quad (16)$$

which convey the logical values of the modulation signals a(t) and b(t).

Neglecting the constant factors 4 (which are also neglected in the drawings) the signals $A^2$ and $B^2$ are output at a first and second receiver output 20 and 21 respectively.

If for example DPSK (difference phase shift keying) is applied, phase modulators are used instead of intensity modulators (FIG. 1) and the DPSK transmission signal $X_D(t)$ is emitted.

Figure 4:
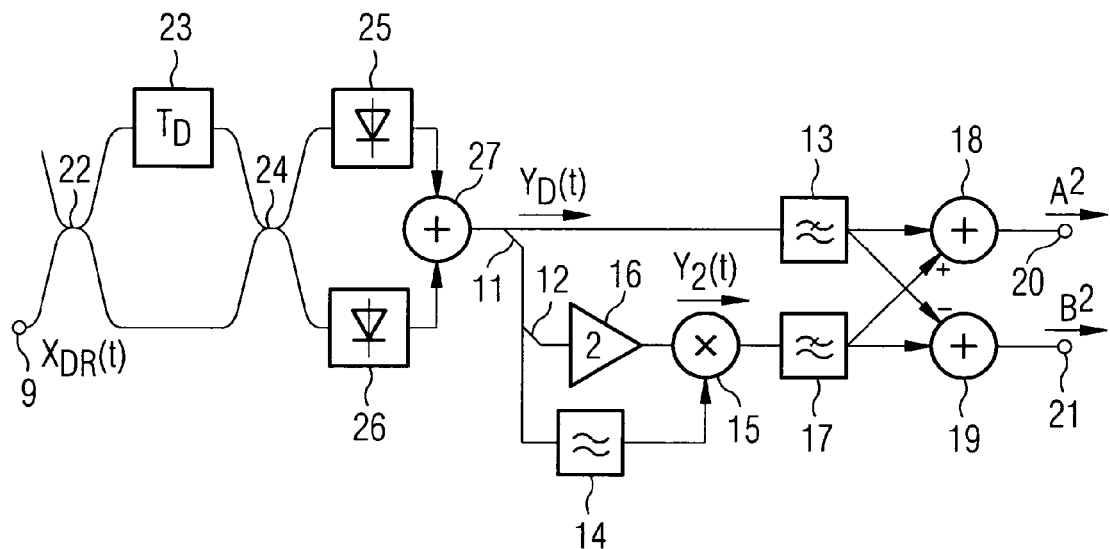
FIG. 4 shows a simplified diagram of a DPSK receiver.

The appropriate DPSK receiver comprises a common DPSK demodulator shown in FIG. 4 using a delay interferometer 22, 23, 24 and a pair of optical-electrical converters 25, 26 (photodiodes). The signal separation circuit 11-19 remains the same as already described.

A received DPSK modulated transmission signal $X_{DR}(t)$ is received at the input 9 and split into two parts by a further splitter 22. A first signal part is led via a delay 23 to a first input to a second combiner (3 dB coupler) 24 and a sec- and signal part is directly fed to a second input of the combiner. Both outputs of the combiner are connected to a pair of electrical-optical converters 25 and 26. The output signals of which are fed to a further adder 27 or the electrical-optical converters 25 and 26 are connected in series in a well kwon manner. Because the delay time of the time delay corresponds to a symbol length the phase difference of two adjacent symbols is directly converted into an amplitude modulated signal $Y_D(t)$.

The unaltered separation circuit 11-19 regains both modulation signals.

If multistage modulation is used, also multistage modulation signals representing symbols e.g. $a(t)=f(a_0(t), a_1(t))$ and $b(t)=f(b_0(t), b1(t))$ are employed. A corresponding receiver comprises appropriate decision circuits for signal separation.

If e.g. a DQPSK (difference quadrature phase shift keying) transmission system is implemented, each modulated transmission signal has four different possible phases. The appropriate receiver comprises two of the receivers shown in FIG. 4, each with an interferometer and a separation circuits.

To reduce the transmission bandwidth optical carrier signals frequencies with a low frequency difference $\Delta f = f_1 - f_2$ are chosen. To minimize the interaction between carriers and therefore the degradation due to intercarrier-interference, orthogonality is desired. Even an overlap of the spectra is feasible, when the carrier signals $L_1$ and $L_2$ are orthogonal:

$$\int_0^T e^{j2\pi f_1 t} e^{-j2\pi f_2 t} dt = 0 \qquad (17)$$

or equivalent $$f1\text{-}f2=\Delta f=n/T=n\times symbol/s \qquad (18),$$

wherein T is the symbol duration, n is an integer, and symbol/s is the symbol rate of the modulation signal.

Figure 5:
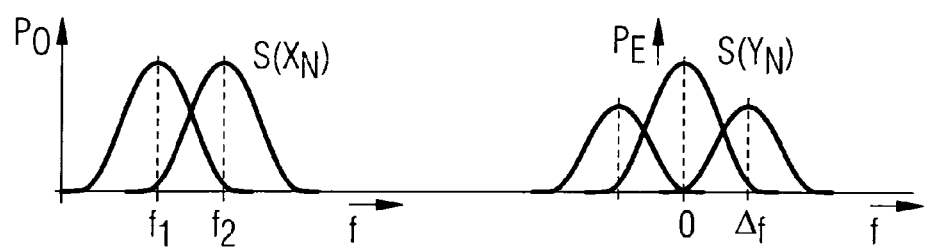
FIG. 5 shows a second example of a spectrum of an optical transmission signal and a spectrum of a demodulated electrical signal.

An appropriate example of an narrow optical spectrum $S(X_N)$ of the optical transmission signal and an associated electrical spectra $S(Y_N)$ is illustrated in FIG. 5. The optical spectra and the electrical spectra associated to the carrier frequencies are overlapping. To separate these signals low pass filters with correlation properties (integrate and dump filters) have to be used.

General, to assure orthogonality, the duration of the pulse must be taken into account as well. But if modulation according to the invention is used, orthogonality is ensured regardless if RZ (return to zero) or NRZ (non return to zero) pulses are transmitted.

DQPSK (difference quadrature phase shift keying) and OOK (on-off keying) are orthogonal when NRZ pulses are used and the frequency separation between carriers $\Delta f$=symbol rate. If the frequency separation between carriers $\Delta f$=n×symbol rate, n=2, 3, NRZ or RZ might be used.

REFERENCE SIGNS

1 first optical source (laser)
2 second optical source (laser)
3 first coupler
1,2,3 carrier signal generator
4 first modulator
5 second modulator
6 first combiner
7 first combiner output
8 second combiner output
9 receiver input
10 optical-electrical converter
11 first splitter
11-19 signal separation unit
12 second splitter
13 first low pass filter
14 oscillator
15 electrical modulator
16 amplifier
17 second low pass filter
18 first adder
19 second adder
20 first receiver output
21 second receiver output
22 further splitter
23 time delay
24 second combiner
25 electrical-optical converter
26 electrical-optical converter
27 further adder
L1 first carrier signal
L2 second carrier signal
$L_1+L_2$ first mixed carrier signal
$jL_1+L_2$ second mixed carrier signal
$X(t)$ transmission signal
$X_A(t)$ ASK modulated transmission signal
$X_D(t)$ DPSK modulated transmission signal
$S(X)$ spectrum of the transmission signal
$P_E(Y)$ spectrum of demodulated signal
$X_{AR}(t)$ received ASK modulated transmission signal
$X_{DR}(t)$ received DPSK modulated transmission signal
$Y_D(t)$ received and converted transmission signal
$Y_A(t)$ received and converted ASK transmission signal

The invention claimed is:

1. A method of transmitting two modulated signals over an optical channel, the method which comprises:
   generating a first mixed carrier signal containing a first optical carrier signal having a first frequency and a second optical carrier signal having a second frequency;
   generating a second mixed carrier signal containing the first optical carrier signal and the second optical carrier signal;
   the first and second optical carrier signals allocated to different mixed carrier signals having mutually different phases;
   modulating the first mixed carrier signal with a first modulation signal to generate a first modulated signal and modulating the second mixed carrier signal with a second modulation signal to generate a second modulated signal; and
   combining the first and second modulated signals and emitting the combined modulated signals as transmission signal.

2. The method according to claim 1, which comprises applying a modulation selected from the group consisting of intensity modulation, phase modulation, and phase difference phase modulation.

3. The method according to claim 1, which comprises generating the optical carrier signals with a frequency difference equal to a symbol rate of the modulation signals or an integer thereof.

4. The method according to claim 3, which comprises generating the mixed carrier signals by combining the optical carrier signals.

5. The method according to claim 1, which comprises generating the optical carrier signals having mutually orthogonal frequencies.

6. The method according to claim 5, which comprises generating the mixed carrier signals by combining the optical carrier signals.

7. The method according to claim 2, which comprises generating the mixed carrier signals by modulating a constant wave signal.

8. A transmitter of an assembly for transmitting two modulated signals via an optical channel, the transmitter comprising:
- a carrier signal generator configured for generating a first mixed carrier signal containing a first optical carrier signal having a first frequency and a second optical carrier signal having a second frequency, and for generating a second mixed carrier signals containing the first optical carrier signal and the second optical carrier signal, with the first and second optical carrier signals allocated to different mixed carrier signals having mutually different phases;
- two modulators, each connected to an output of said carrier signal generator and receiving a mixed carrier signal, said modulators being configured for receiving a first modulation signal and a second modulation signal, respectively, each modulating a first mixed carrier signal and a second mixed carrier signal, respectively; and
- a first combiner connected to said modulators and configured for combining modulated signals output from said modulators and emitting a transmission signal.

9. The transmitter according to claim 8, wherein said carrier signal generator comprises two optical carrier sources respectively connected to a first input and a second input of a first coupler.

10. The transmitter according to claim 9, wherein the optical carrier signals have a frequency difference equal to the frequency of the modulation signals or an integer thereof.

11. The transmitter according to claim 9, wherein said carrier signal generator is configured for generating mutually orthogonal optical carrier signals.

12. The transmitter according to claim 8, wherein said carrier signal generator comprises a constant wave generator, a modulation unit, and a coupler for generating two mixed carrier signals.

13. The transmitter according to claim 12, wherein the optical carrier signals have a frequency difference equal to the frequency of the modulation signals or an integer thereof.

14. The transmitter according to claim 12, wherein said carrier signal generator is configured for generating mutually orthogonal optical carrier signals.

15. The transmitter according to claim 8, wherein said modulators are intensity modulators.

16. The transmitter according to claim 8, wherein said modulators are difference phase modulators.

* * * * *